E. E. KERNS.
SPRING WHEEL.
APPLICATION FILED APR. 25, 1912.
1,067,349.
Patented July 15, 1913.
2 SHEETS—SHEET 1.
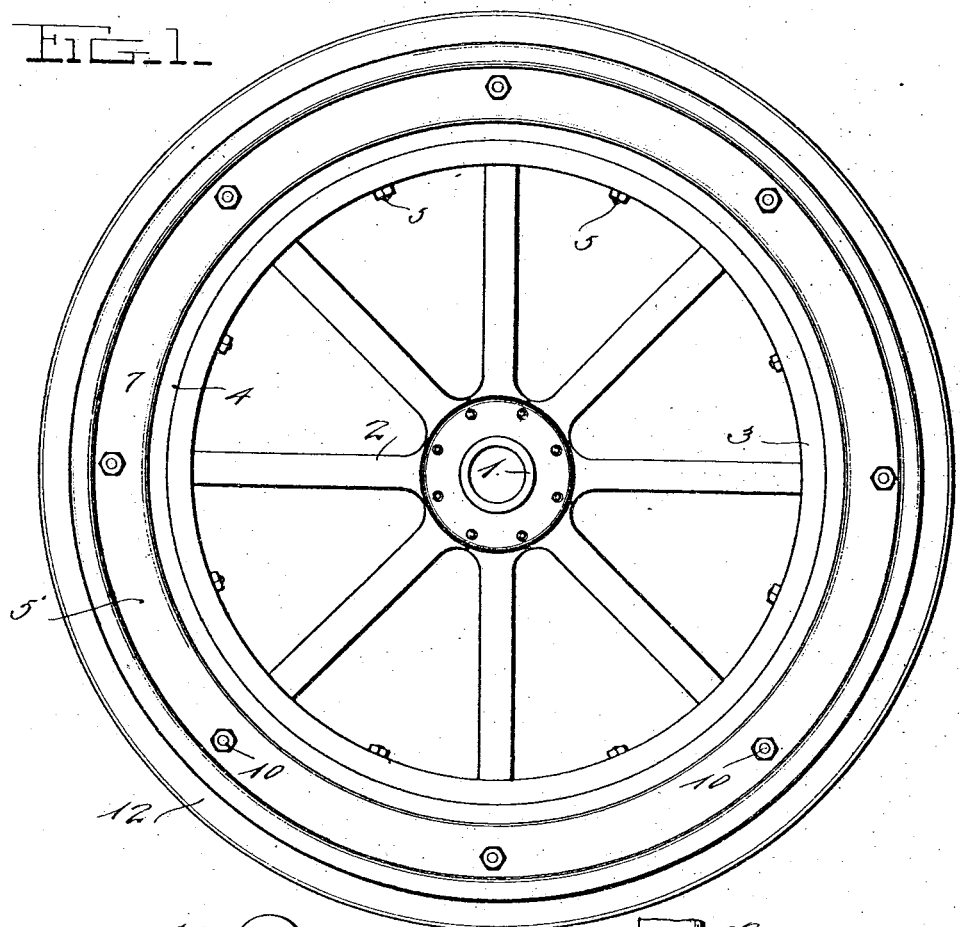
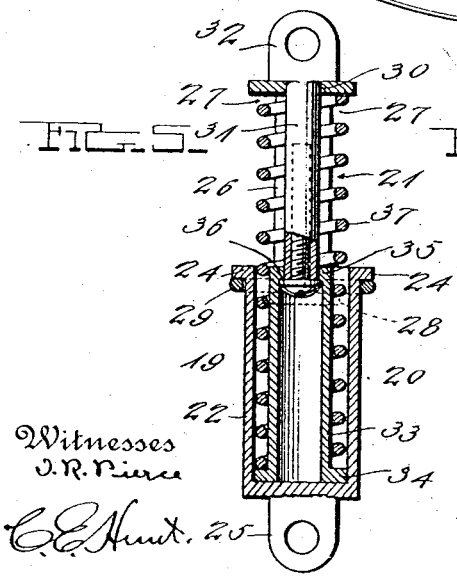
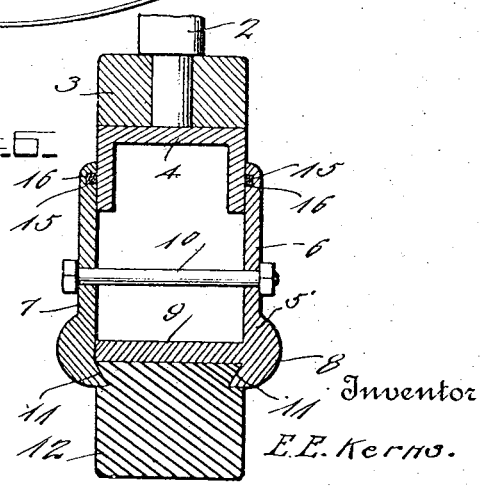
Witnesses
J. R. Pierce
C. E. Hunt
Inventor
E. E. Kerns.
by H. B. Willson & Co.
Attorneys

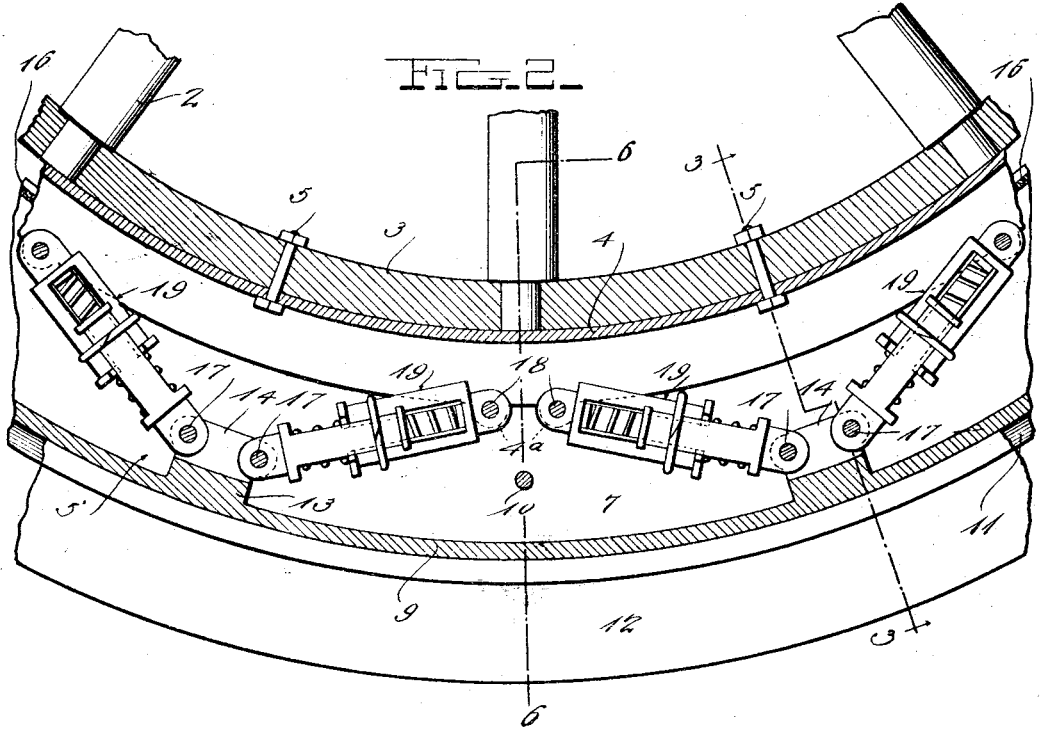
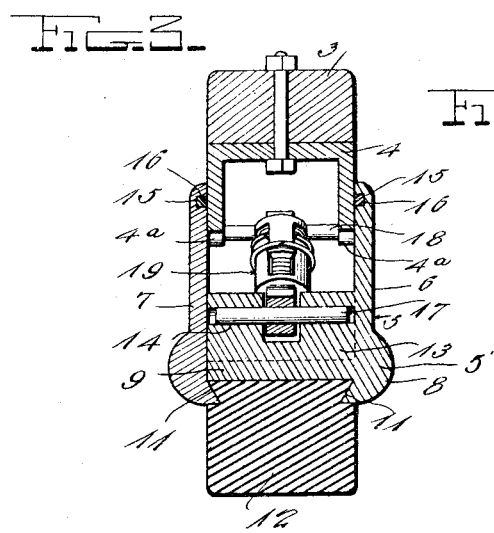
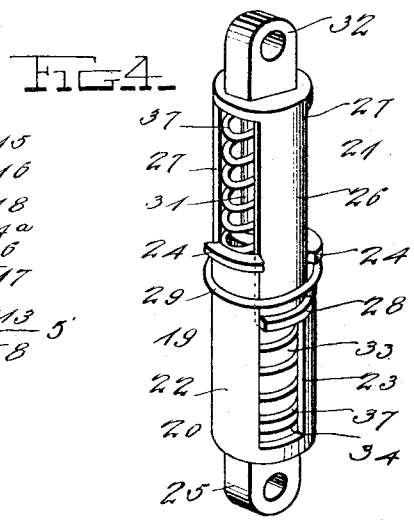

UNITED STATES PATENT OFFICE.

ELMER E. KERNS, OF BRADFORD, PENNSYLVANIA.

SPRING-WHEEL.

1,067,349.  Specification of Letters Patent.  Patented July 15, 1913.

Application filed April 25, 1912. Serial No. 693,100.

*To all whom it may concern:*

Be it known that I, ELMER E. KERNS, a citizen of the United States, residing at Bradford, in the county of McKean and State of Pennsylvania, have invented certain new and useful Improvements in Spring-Wheels; and I do declare the following to be a full, clear, and exact description of the invention, such as will enable others skilled in the art to which it appertains to make and use the same.

This invention relates to improvements in spring wheels.

One object of the invention is to provide a wheel of this character having an improved construction of rim formed in sections which are connected by springs whereby all shocks and jars resulting from the passage of the wheel over rough uneven surfaces will be absorbed.

Another object is to provide a wheel of this character having an improved construction and arrangement of springs for operatively connecting the sections of the rim together.

With these and other objects in view, the invention consists of certain novel features of construction, and the combination and arrangement of parts as will be more fully described and claimed.

In the accompanying drawings; Figure 1 is a side view of my improved wheel; Fig. 2 is a central vertical section of a portion thereof; Fig. 3 is a similar view taken at right angles to and on the line 3—3 of Fig. 2; Fig. 4 is an enlarged perspective view of one of the springs which connect the sections of the rim together; Fig. 5 is an enlarged longitudinal sectional view through the spring shown in Fig. 4; Fig. 6 is a cross sectional view of the rim and felly of the wheel taken on the line 6—6 of Fig. 2.

Referring more particularly to the drawings, 1 denotes the hub and 2 denotes the spokes of my improved wheel. Secured to the outer ends of the spokes is a felly 3 which may be of any suitable construction as may also be the spokes and hub of the wheel. Engaged with the felly 3 is the channel shaped inner section 4 of the wheel rim, said section being firmly secured to the felly by bolts 5 arranged therethrough and through the rim between the spokes as shown. On the outer edges of the sides of the section 4 of the rim at suitable intervals and at equal distances apart are pairs of apertured spring attaching ears 4ª.

Slidably engaged with the inner section 4 of the rim is an outer section 5' comprising side members or flanges 6 and 7 which are engaged with the opposite sides of the rim section 4. On the outer edges of the members 6 are annular beads or enlargements 8 and formed integral with the inner side of one of said members is an annular tire receiving plate or ring 9, the outer edge of which is engaged with the inner side of the member 7. The members 6 and 7 of the outer section of the rim are bolted together at intervals by transversely disposed connecting bolts 10 arranged therethrough as shown. The outer edges of the members 6 and 7 extend a short distance beyond the annular plate or rim 9 and have the inner surfaces of their projecting edges recessed at an angle to form tire gripping flanges 11, between which and the outer surface of the ring 9 is a dove tailed shaped space within which is engaged the dove tailed shaped inner edge of a solid rubber or other form of tire 12.

Arranged on the inner side of the annular plate or rim 9 is a series of inwardly extending radially disposed lugs 13 on the inner end of which are formed pairs of apertured ears 14. The lugs 13 and ears 14 of the rim 9 are disposed midway between the pairs of apertured ears on the sides of the inner section of the rim. In the inner sides of the members 6 and 7 of the outer section of the rim are annular grooves 15 having therein annular packing rings 16 which form a dust tight engagement with the outer sides of the inner section of the rim and prevent dust or dirt from entering between the sections of the rim.

Engaged with the apertured ears 14 are transversely disposed spring connecting pins 17 while with the apertured ears 4ª are engaged transverse spring attaching pins 18. Arranged between the apertured ears 4ª and 14 and connected to the pins 17 and 18 are spring members 19 each of which comprises tubular telescoping sections 20 and 21. The section 20 comprises an outer socket 22 having at diametrically opposite points in its sides rectangular longitudinally disposed notches 23 and having on the inner end of its sides segmental stop flanges 24. On the outer end of the socket 22 is an apertured attaching lug 25 which is adapted to receive one of the pins 18 of the ears 4ª on the outer edge of the inner section 4 of the rim. The section 21 of the spring member comprises a socket 26 having at diametrically opposite points in its sides longitudinally disposed notches 27 with which are slidably engaged the solid portions of the sides of the socket 22 of the member 20, while the solid portions of the socket 26 slidably engage the notches 23 in the socket 22 as shown. On the inner end of the solid portions of the socket 26 are segmental stop flanges 28 and engaged with the inner ends of the solid portions of the sockets between the flanges 24 and 28 thereon is a stop ring 29 which limits the outward movement of the sockets and prevents the disengagement of the sections 20 and 21 of the spring member.

In the outer end of the socket 26 is a centrally disposed aperture 30 with which is slidably engaged an interiorly threaded tubular shank 31 having on its outer end an apertured head 32 which is adapted to receive one of the pins 17 in the outer section 5' of the rim. Slidably mounted on the tubular shank 31 within the socket 26 is a spring retaining sleeve 33 having on its outer end an annular stop flange 34. The inner diameter of the sleeve 33 is slightly larger at the outer portion of the sleeve than at the inner portion, thereby forming an annular shoulder 35 with which is engaged the head of a sleeve attaching screw 36 which is screwed into the threaded shank 31 and thereby holds the sleeve in place on the shank. The outside diameter of the sleeve is slightly less than the inner diameter of the socket 26 and on the sleeve 33 and shank 31 between the flange 34 on the sleeve and the outer end of the socket is arranged a coiled spring 37 the pressure of which is exerted to force the sockets 22 and 26 apart or away from each other, said spring thus forming a yielding resistance between the sections of the member as will be readily understood.

By thus constructing the spring members 19 and arranging the same between the inner and outer sections of the rim as herein shown and described, it will be seen that the movement of said sections of the rim on each other is yieldingly resisted in practically all directions thereby providing a cushioned support for the axles engaged with the hub of the wheel, and for the body of the vehicle and the load carried thereby.

Having thus described my invention, what I claim is:

1. In combination with a felly and movable rim section, of a series of spring attaching members each of which is composed of two sockets having sliding and interlocking engagement, means for preventing the sockets from becoming disengaged, a spring retaining sleeve slidably located within one of the sockets, a stop flange forming a part of the sleeve, a shank carried by the retaining sleeve, a spring adjusting screw secured to the inner end of the shank and adapted for contact with the stop flange of the sleeve, and a spring arranged on said sleeve and shank and having its ends engaged with the outer ends of the sockets whereby the latter are forced in opposite directions and are yieldingly held in outwardly projected positions.

2. In a spring wheel, a felly, a rim comprising an inner section secured to said felly, an outer section slidably engaged with said inner section, a series of spring connections comprising pairs of sockets having therein longitudinally disposed notches, said notched portions of the sockets having a sliding interlocking engagement, segmental stop flanges on the inner ends of said sockets, a stop ring arranged around between said flanged ends whereby the same are prevented from becoming disengaged, an apertured attaching lug on the outer end of one of said sockets, a tubular interiorly threaded shank having a sliding engagement in the opposing socket, an apertured head on the outer end of said shank, a spring retaining sleeve arranged in the opposite socket, said sleeve having in its inner end a reduced bore, a stop flange on the outer end of said sleeve, a spring adjusting screw loosely engaged with said sleeve and having a threaded engagement with said tubular shank, and a spring arranged on said sleeve and shank and having its ends engaged with the outer ends of the sockets whereby the latter are forced in opposite directions and are yieldingly held in outwardly projected positions.

In testimony whereof I have hereunto set my hand in presence of two subscribing witnesses.

ELMER E. KERNS.

Witnesses:
MARY T. KERNS,
DAVID H. JACK.